United States Patent
Timothy et al.

(10) Patent No.: US 6,366,240 B1
(45) Date of Patent: Apr. 2, 2002

(54) LOCATION OF AIRCRAFT WITH TIME DIFFERENCE OF ARRIVAL

(75) Inventors: Lamar K. Timothy, Kaysville, UT (US); Keith R. Branning, Howell, NJ (US); Michael L. Ownby, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/593,900

(22) Filed: Jun. 14, 2000

(51) Int. Cl.$^7$ ................................. G01S 5/02
(52) U.S. Cl. .................. 342/417; 342/450; 342/444
(58) Field of Search .................. 342/417, 450, 342/444

(56) References Cited

U.S. PATENT DOCUMENTS 5,285,209 A * 2/1994 Sharpin et al. ............. 342/424
5,724,047 A * 3/1998 Lioio et al. ................. 342/442

* cited by examiner

Primary Examiner—Theodore M. Blum
(74) Attorney, Agent, or Firm—Perman & Green, LLP

(57) ABSTRACT

A system and method for determining the position of an aircraft. An aircraft signal is received by a first antenna and a second antenna, the first antenna being at a known baseline distance from the second antenna. A processor is used to calculate the time difference of arrival range between the second antenna and the aircraft using a common time reference signal. The position of the aircraft is determined by a position determinator based upon the baseline distance between the first and second antennas, the range between the first antenna and the aircraft, and the time difference of arrival range between the second antenna and the aircraft.

20 Claims, 2 Drawing Sheets

LOCATION OF AIRCRAFT WITH TIME DIFFERENCE OF ARRIVAL

BACKGROUND OF THE INVENTION

1. Field of Invention

The present invention relates generally to determining the position of an aircraft, and in particular to an apparatus and method for determining the position of an aircraft using time difference of arrival processing and range measurements.

2. Description of Related Art

The use of time difference of arrival techniques to determine the location of a transmitter is not unknown in the art. For example, U.S. Pat. No. 5,570,099 discloses a TDOA/FDOA technique for locating a transmitter. However, this technique requires the use of two or more separated radio frequency ("RF") receiver terminals with large separation baselines for high accuracy. These receiver terminals also require specialized high gain antennas to produce adequate received signal strength for time difference of arrival ("TDOA") calculations.

Typically, in order to produce high TDOA processing gain, the use of two or more highly stabilized clocks is required. These clocks are generally expensive atomic clocks and are local to each antenna receiver in order to accurately mark the time of arrival of the received signal.

Relative clock drift prevents the correlation of long blocks of data for high signal processing gain. Separate atomic clocks at each antenna receiver are used to reduce clock drift. Bringing RF signals together over long distances using RF coaxial cables or expensive wave-guides can be difficult. Coax attenuation of 500 dB per kilometer prevents a baseline separation of more than about 100 feet (30.48 meters). Secondary free space RF links cannot be used due to the interference with existing receivers.

Typically, high gain tracking antennas and atomic clocks for signal processing gain are required to achieve the sufficient signal strength for accurate TDOA calculations. These high gain antennas and atomic clocks tend to be expensive.

SUMMARY OF THE INVENTION

The present invention is directed to in a first aspect, a system for determining the position of an aircraft. The system comprises a first antenna, a second antenna, a processor coupled to the first and second antennas, and a position determinator. In the preferred embodiment, the first antenna is located at a first position, the second antenna is at a second position, and the baseline distance between the two antennas is known. The first and second antennas are adapted to receive an aircraft signal. The processor is adapted to calculate a time difference of arrival range between the second antenna and the aircraft using a common time reference signal. A position determinator determines the position of the aircraft based upon the baseline distance between the first antenna and the second antenna, the range between the first antenna and the aircraft, and the time difference of arrival range between the second antenna and the aircraft.

In another aspect, the present invention is directed to a method for determining the position of an aircraft. The method comprises positioning a first antenna at a spaced baseline distance from a second antenna and receiving an aircraft signal at each antenna. A first signal is sent from the first antenna, and a second signal from the second antenna, to a processor. The processor is preferably adapted to determine the time difference of arrival range between the second antenna and the aircraft using a sampled data set produced by time sampling the first signal and the second signal using a common time reference signal. Both first and second signals correspond to the aircraft signal. In the preferred embodiment, the position of the aircraft is determined by the baseline distance between the second antenna and the first antenna, the range between the first antenna and the aircraft, and the time difference of arrival range between the second antenna and the aircraft.

In another aspect, the present invention is directed to a method of using a time difference of arrival processor to determine the position of an aircraft transmitting a signal. The range ($R_1$) between a second antenna and the aircraft is determined by measuring the range ($R_2$) between a first antenna and the aircraft and calculating a time difference of arrival between the signal from the aircraft received by the second antenna and the signal from the aircraft received by the first antenna using a common time reference signal. The time difference of arrival may be adjusted for time slippage correlation delay and the speed of light. The position of the aircraft is determined by the baseline distance ($R_3$) between the first antenna and the second antenna, the range ($R_2$) between the first antenna and the aircraft and the range ($R_1$) between the second antenna and the aircraft.

BRIEF DESCRIPTION OF THE DRAWINGS

The foregoing aspects and other features of the present invention are explained in the following description, taken in connection with the accompanying drawings, wherein.

DESCRIPTION OF THE PREFERRED EMBODIMENT(S)

Figure 1:
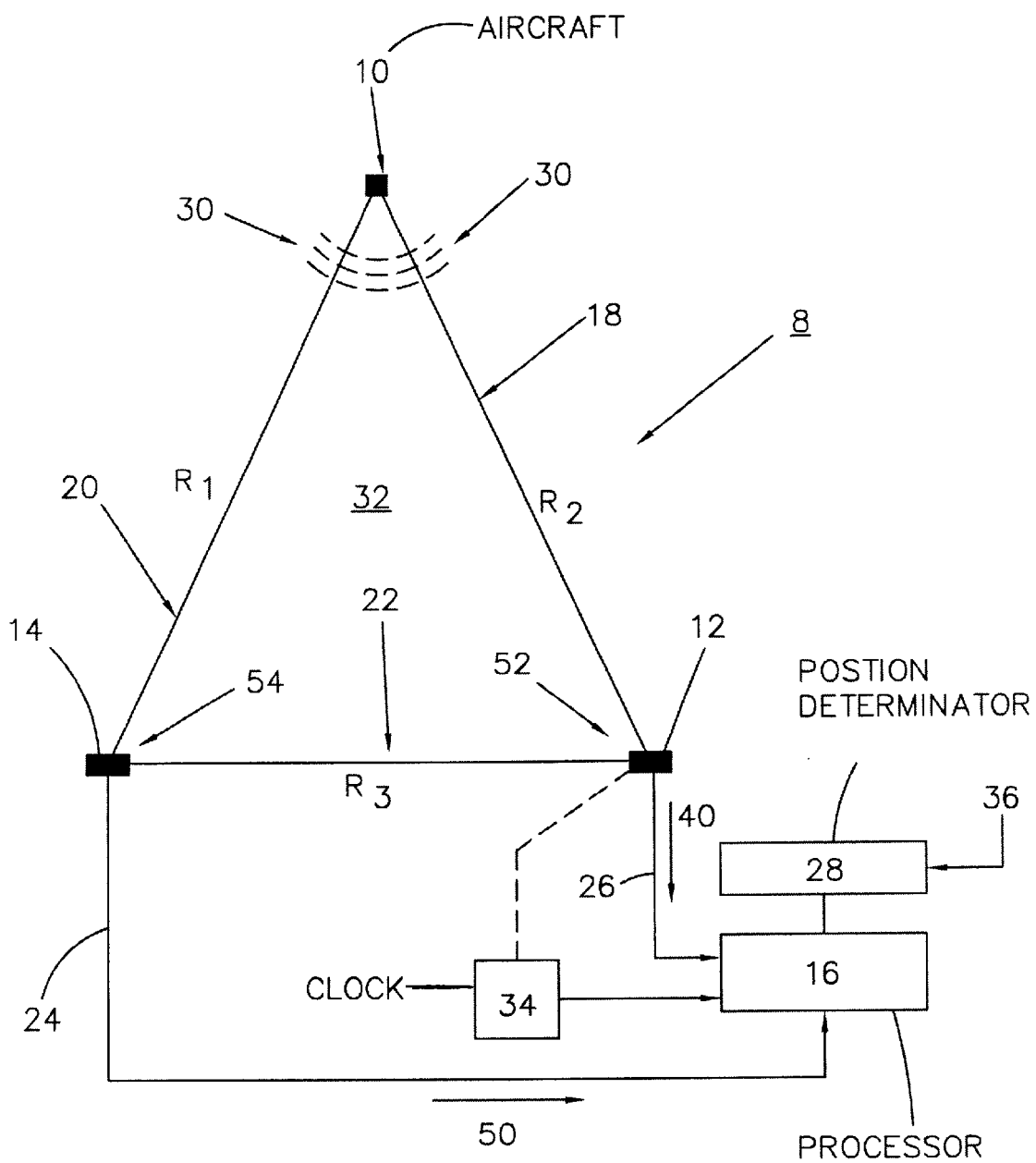
FIG. 1 is a schematic layout of a system incorporating features of the present invention.

Referring to FIG. 1, there is shown a schematic layout of a system 8 for determining a position of an aircraft 10. Although the present invention will be described with reference to the single embodiment shown in the drawings, it should be understood that the present invention can be embodied in many alternate forms of embodiments. In addition, any suitable size, shape or type of elements or materials could be used.

The system 8 generally comprises a first antenna 12, a second antenna 14, a processor 16, and a position determinator 28. In alternate embodiments the system could include additional items such as "receive only" radio frequency ("RF") hardware to locate the position of an aircraft 10 using time difference of arrival ("TDOA") processing. In an alternative embodiment, the communications hardware of the system 8 could be any suitable type of communication hardware including, other than radio frequency receive only hardware.

The first antenna 12 is preferably a high gain directional antenna. Antenna 12 may also include range measurement capability. It is a feature of the present invention that the antenna 12 can have poor or no angle tracking capability. However, in an alternative embodiment, the first antenna 12 could have angle tracking capabilities. One of the features of the present invention is that the location or position of the aircraft 10 can be determined by TDOA using only distance measurements rather than using combined angle and direction measurements, without the need for multiple, high gain tracking antennas.

The second antenna 14 is preferably a small, inexpensive, low gain omni-directional antenna, such as a dipole antenna. However, in an alternative embodiment, the second antenna could comprise any suitable type of antenna, including other than a low gain, omni-directional antenna. The second antenna 14 may also be coupled to a receiver with a low noise amplifier with no down converter if a signal from the second antenna 14 is a fiber optic signal at RF. Alternatively, second antenna 14 may include any suitable communication or signal processing hardware other than a low noise amplifier.

The first antenna 12 and the second antenna 14 are typically coupled to the processor 16. In an alternate embodiment, antenna 12 and antenna 14 may be coupled to other RF hardware, such as amplifiers or drivers, which are in turn coupled to the processor 16. The processor 16 is preferably a TDOA processor adapted to determine a TDOA between a first signal 40 received from the first antenna 12 and a second signal 50 received from the second antenna 14. In the preferred embodiment, both the first signal 40 and the second signal 50 correspond to the aircraft signal 30, except that one of the first and second signals 40, 50, is time shifted with respect to the other. In an alternative embodiment, any suitable means to determine the TDOA between first signal 40 and second signal 50 may be used, including, other than processor 16. The processor 16 is typically adapted to receive radio frequency ("RF"), intermediate frequency ("IF") or baseband signals, and calculate a TDOA between the signals. The processor 16 may also include a down converter oscillator and equivalent filters if the first signal and the second signals are fiber optic signals at RF. In an alternate embodiment, the processor 16 may include any suitable communication or signal processing hardware including other than a down converter oscillator and equivalent filters.

The processor 16 is preferably coupled to a position determinator 28 which is adapted to determine the position of the aircraft based upon the baseline distance between the first antenna 12 and the second antenna 14, the range between the first antenna and the aircraft, and the TDOA range between the second antenna and the aircraft. In an alternate embodiment, any suitable means to determine the position of the aircraft based upon the baseline distance between the first antenna 12 and the second antenna 14, the range between the first antenna and the aircraft, and the TDOA range between the second antenna and the aircraft, may be used, including other than position determinator 28. In the preferred embodiment, the position determinator 28 may be a fixed ground station terminal or a mobile unit. Typically, the position determinator 28 is the site of first antenna 12, but it may also be located remotely from the antenna 12. In an alternate embodiment, the position determinator 28 may be a component of, or function of, the processor 16.

The system 8 may also include a clock, or local oscillator 34. The clock 34 may be used to time stamp the first signal 40 from the first antenna 12 and the second signal 50 from the second antenna 14. In an alternate embodiment, any suitable means to provide a time reference for first signal 40 and second signal 50 may be used, including, other than the clock 34. In the preferred embodiment, the clock 34 is a ground crystal clock, however, any suitable clock may be used. Preferably, clock 34 is common to the components of system 8, including antennas 12,and 14, processor 16 and position determinator 28. In alternate embodiments, separate clocks may be used to time stamp the first and second signals 40, 50. It is a feature of the present invention to substitute high TDOA signal processing gain for antenna gain. This eliminates the need for more than one specialized high gain antenna. However, the generation of high TDOA processing gain typically requires two or more highly stabilized clocks, typically atomic clocks, local to each antenna receiver. These two clocks are required to sample and accurately time stamp respective received signals for high processing gain TDOA correlation calculations. However, relative clock drift prevents correlating long blocks of data for high signal processing gain. The separate atomic clocks at each site are used to reduce clock drift. It is a feature of the present invention to use a common clock to sample and time stamp received signals in order to eliminate relative clock drift. The use of a common clock for the components of system 8 provides signals time stamped to a common reference which provides higher signal processing gain in the processor 16. This unique feature allows the second antenna 14 to be a low gain, omni-directional antenna.

The connections between and among the first antenna 12, the second antenna 14, the processor 16 and the position determinator 28 are preferably made using fiber optic links or cables. However, in an alternate embodiment, any suitable type of link or connection could be provided between or among the antennas 12, 14, the processor 16 and the position determinator 28. The use of a coaxial cable, wave guide or fiber optic cable is needed in order to contain the received signals and prevent local interference of the receive antennas 12, 14 in the event the signals are re-radiated or transmitted in free space, to the TDOA signal processor 16. It is a feature of the present invention to use a fiber optic RF cable to connect the receiver terminals of the system 8 to an inexpensive common clock in the TDOA processor in order to allow a large baseline (R3) distance between the first antenna 12 and the second antenna 14. In the preferred embodiment, this baseline distance can exceed 1000 feet (304.80 meters). It is difficult to use RF coaxial cables in order to bring RF signals together over long distances. In RF coax, coaxial attenuation of 500 dB per kilometer prevents a baseline separation of more than about 100 feet (30.48 meters). Wave-guides are very expensive. The use of secondary free space RF links would interfere with the existing receivers. Fiber optic RF links are generally inexpensive and typically can have attenuation of only about 0.5 dB per kilometer. This allows antenna terminal baseline separations of more than 1000 feet (304.80 meters). It is a feature of the present invention to use a fiber optic RF link to bring together two or more RF signals spaced by a baseline distance of in excess of 1000 feet (304.80 meters) and process the signals with an inexpensive common crystal clock. These features of the present invention produce high TDOA signal processing gain that can be substituted for antenna signal gain. Consequently, the use of atomic clocks and a high gain antenna can be eliminated in accurately determining the TDOA location of an aircraft.

The system of the present invention can be used to accurately determine the position of the aircraft 10. The method generally comprises positioning a first antenna 12 a spaced baseline distance from a second antenna 14.

In the preferred embodiment, the baseline distance is known and can exceed 1000 feet (304.80 meters). However, in an alternate embodiment, the baseline distance can be any suitable distance other than including a distance more than 1000 feet (304.80 meters). For example, a distance of less than 1000 feet (304.80 meters) could be used. A larger baseline distance can be used to improve, or achieve a high position accuracy of the aircraft with the TDOA calculations.

Generally, an aircraft signal 30 is received at each of the antennas 12, 14. A TDOA between a first signal 40 from the first antenna 12, and a second signal 50 from the second antenna 14 is calculated. A TDOA range 20 between the second antenna 14 and the aircraft 10 is calculated based upon the range 18 between the first antenna 12 and the aircraft 10 and the TDOA between the first and second signals 40, 50. Preferably, the range 18 is measured by the ranging capabilities of the first antenna 12. However, in an alternate embodiment, the range 18 may be determined by any suitable means such as other than the ranging capabilities of the first antenna 12. The position of the aircraft may be determined from the spaced baseline distance 22 between the first antenna 12 and the second antenna 14, the range 18, and the TDOA range 20.

Generally, it is assumed that the aircraft 10 is in communication with the position determinator 28 and is sending a signal 30. In an alternate embodiment, any other suitable signal or means of detecting aircraft 10 may be used, such as other than aircraft signal 30. Both the first antenna 12 and the second antenna 14 are typically adapted to receive the aircraft signal 30. Generally, the aircraft signal 30 as received by the first antenna will be time shifted with respect to the aircraft signal 30 received by the second antenna 14.

Typically, the aircraft signal 30 is received at the first antenna 12 and the second antenna 14. Each antenna may include processing hardware adapted to processes the received signal by digitizing and time stamping the received signal. The first antenna 12 and the second antenna 14 will typically generate the first signal 40 and the second signal 50 respectively. In the preferred embodiment, signals 40, 50 will be time stamped with the clock 34. However, in an alternate embodiment, any suitable means of providing a time reference for signals 40, 50, may be used, including other than the clock 34. One of the features of the present invention is that the use of a common clock to time stamp the first and second signals 40, 50, results in long blocks of digitized signals in the processor 16 during the cross correlation process. A cross-correlation process is typically used to determine the TDOA between signals 40 and 50. High TDOA signal processing gain can be substituted for antenna gain. The use of a common clock eliminates clock drift and allows the long blocks of data to be correlated for high signal processing gain. These long blocks of digitized signals, or correlated data, result in high signal processing gain of the processor 16 which allows the second antenna 14 to be an inexpensive, low gain, omni-directional antenna.

The first signal 40 and the second signal 50 are passed to the processor 16. In an alternate embodiment, antenna 12 and antenna 14 may each receive the aircraft signal 30, and pass first and second signals 40, 50 in analog form to the processor 16 where each signal 40, 50 can be time stamped.

The processor 16 then typically receives the first signal 40 and the second signal 50 and calculates a TDOA between the signals. Typically, the TDOA is measured by sampling the first and second signals 40, 50 and determining the time slippage correlation between the sampled blocks of data. In the preferred embodiment, the first and second signals 40, 50 may be RF, IF or baseband signals. Down converting RF to some convenient IF frequency for sampling provides a high level of accuracy resolution. Preferably, the sampling rate should be at least two times the bandwidth of the first and second signals 40, 50, although any suitable bandwidth may be used. The sampled data set is then passed to the processor 16, where the TDOA is determined. Typically, the TDOA is determined using a standard cross correlation process, however, any suitable TDOA calculation process may be used. It is assumed that the first and second signals 40, 50, are not periodic. In a typical cross correlation process, at some time stamp reference, corresponding samples from the two data streams are multiplied and summed. If the correlation is small, the sum will be near zero. Then the first data set is slipped one sample past the second, and the multiply and sum operations are repeated. This process is repeated until the sum becomes a large positive value, which occurs when corresponding multiplied values are alike. The slip time for the two sets of data to align relative to the time stamp is the TDOA value. In an alternate embodiment, the TDOA may be determined by any conventional time slippage correlation technique including, other than the foregoing cross-correlation procedure. Typically, the processor 16 will function similar to a pseudo noise ("PN") code receiver with its stored-local-noiseless PN code. As cross correlation proceeds, the signal received from the first antenna 12 will be almost noiseless, as in the PN code case. Consequently, the cross correlation calculation, even with the low gain, noisy signal received from the second antenna 14, will produce high processing gain when the two received signals match.

Once the TDOA between the first and second signals, 40, 50, is determined, the method typically involves calculating the TDOA range 20 using the TDOA and the range 18. In the preferred embodiment, the range $20(R_1)$ between the second antenna and the aircraft can be determined by the formula:

$$R_1 = R_2 + TDOA \times c$$

where $R_2$ is the range 18 between the first antenna 12 and the aircraft, TDOA is the time delay between the first and second signals 40, 50, and c is the speed of light. The speed of light may be corrected for atmospheric refraction. Preferably, the range 18 is typically measured by the ranging calculations of the first antenna 12. However, in an alternate embodiment, the range 18 may be provided by any suitable method.

A triangle 32 formed by the baseline distance $22(R_3)$ between the two antennas, the range $18(R_2)$, and the TDOA-determined range 20 ($R_1$) can be used to determine the position of aircraft 10. For improved accuracy, the ground antennas could be survey with differential ground position systems ("GPS") to within +/−1 cm, and the whole system 8 calibrated with GPS data onboard the aircraft 10. Delays in cable lengths could also be calibrated in any conventional method, including the GPS method mentioned above. A second signal 36 from the aircraft 10 can be used to complete the three-dimensional position determination of the aircraft. The second signal 36 may typically include the altitude data of the aircraft 10. In the preferred embodiment, the second signal 36 is the barometer altitude data of the aircraft.

Figure 2:
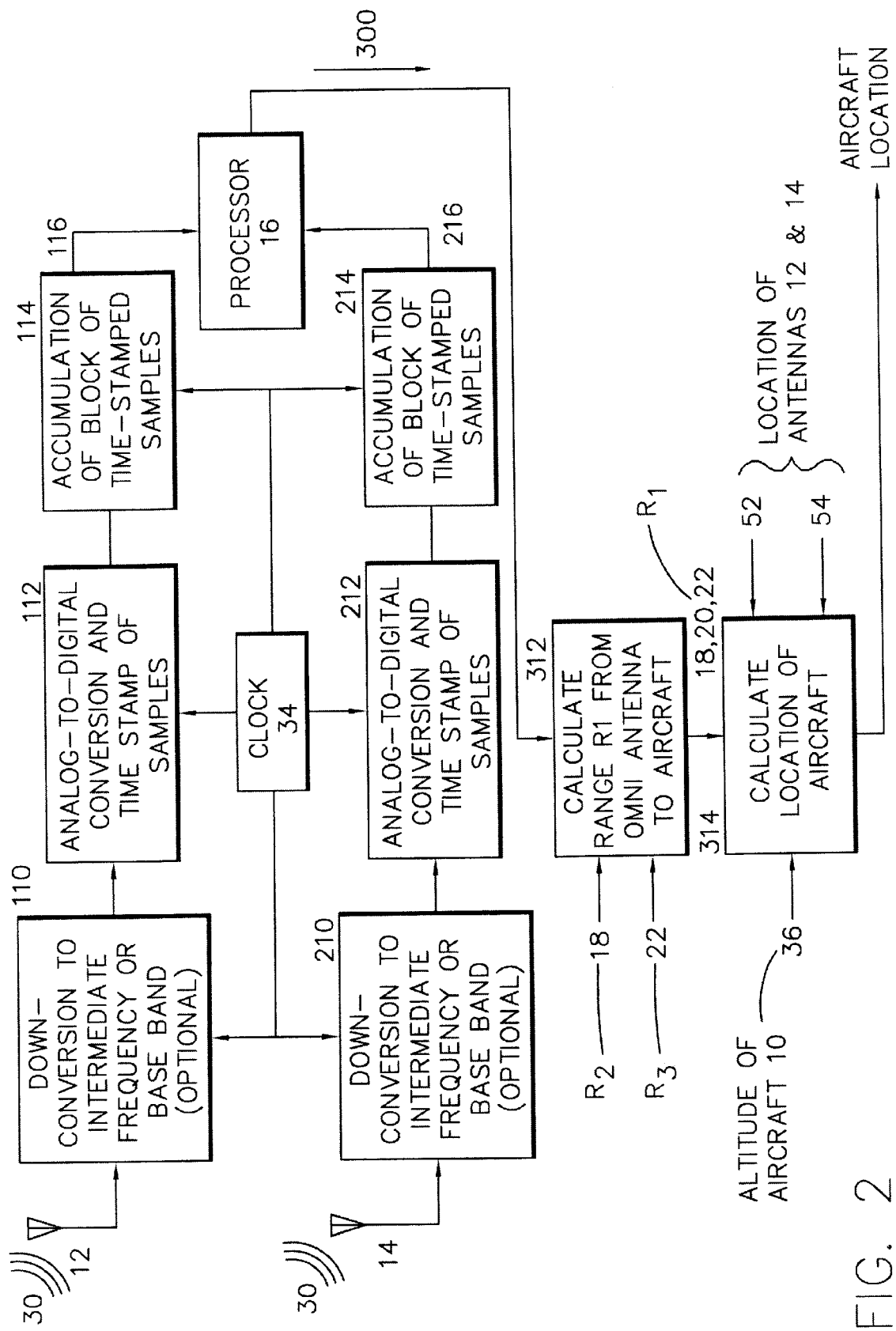
FIG. 2 is a flowchart of a method of the present invention.

A typical method of the present invention is illustrated in the flowchart of FIG. 2. As shown in FIG. 2, antennas 12 and 14 each receive the aircraft signal 30. The received signals can then be down converted to an IF or baseband signal as indicated by 110 and 210. The signals may then be processed through an analog-to-digital converter, sampled and time stamped in blocks of data as indicated by 112 and 212. The blocks of time stamped samples are accumulated as indicated by 114 and 214 and the time stamped signal blocks 116 and 216 are then transmitted to the processor 16, where the TDOA between the time signals blocks 116 and 216 is determined. The steps of down conversion, analog to digital conversion, time stamping, and accumulation of blocks of time stamped samples could be functional aspects of processor 16. In an alternate embodiment, the aforementioned steps may be carried out in a processor, including other than processor 16. As shown in FIG. 2, the clock, or local oscillator 34 is common to the steps of down converting as indicated by 110 and 210, analog-to-digital conversion and the time stamping as indicated by 112 and 212, and accumulating the blocks of the stamped samples as indicated by 114 and 214. By using the common clock 34, the block size of the time stamped data can be arbitrarily large. The large block size increases the processing gain significantly and processor gain can be traded for antenna gain. Thus, the second antenna 14 can be a low gain omni antenna. If a separate clock is used for each stage of the process, time drift results in the stages relative to each other. The time drift limits the block sizes of stamped, sampled data. Thus, an expensive higher gain antenna that requires steering or precise pointing is required.

The TDOA signal 300 is then used, along with the range 18 ($R_2$) between the aircraft 10 and first antenna 12, and baseline distance 22 ($R_3$) between the first antenna 12 and the second antenna 14, to calculate the TDOA range 20 ($R_1$) between the second antenna 14 and the aircraft 10 as indicated by 312. The distance 18, range 20 and 22, together with the altitude signal 36 from the aircraft 10, are used to determine the location of the aircraft 10 as indicated by 314. As shown in FIG. 2, the locations 52 and 54 of antennas 12 and 14 respectively, remain constant, and may be factored into calculating the location of aircraft 10.

Thus, the apparatus and method of the present invention allows the location of an aircraft to be accurately while eliminating the need for expensive atomic clocks and a high gain directional antenna. Antenna gain can be substituted with TDOA signal processing gain by using an inexpensive common clock to time stamp and correlate the received signals, and bringing the signals together with an RF fiber optic link. Even when the RF signals are spaced by a distance in excess of 1000 feet (304.80 meters), the use of a common clock and RF fiber optic link results in high TDOA signal processing gain that can be substituted for antenna signal gain. It should be understood that the foregoing description is only illustrative of the invention. Various alternatives and modifications can be devised by those skilled in the art without departing from the scope of the invention. Accordingly, the present invention is intended to embrace all such alternatives, modifications and variances which fall within the scope of the appended claims.

What is claimed is:

1. A system for determining a position of an aircraft comprising:
    a first antenna at a first position adapted to receive an aircraft signal;
    a second antenna at a second position adapted to receive the aircraft signal, the second antenna being positioned at a known baseline distance from the first antenna;
    a processor coupled to the first and second antennas, the processor adapted to calculate a time difference of arrival range between the second antenna and the aircraft using a common time reference signal; and
    a position determinator adapted to determine the position of the aircraft based upon the distance between the first and second antenna, a range between the first antenna and the aircraft, and the time difference of arrival range between the second antenna and the aircraft.

2. The system of claim 1 wherein the first antenna is a high gain directional antenna.

3. The system of claim 1 wherein the first antenna is adapted to provide range measurement.

4. The system of claim 1 wherein the first antenna is without angle tracking capability.

5. The system of claim 1 wherein the second antenna is a low gain antenna.

6. The system of claim 1 wherein the second antenna is an omni-directional antenna.

7. The system of claim 1 wherein the common time reference signal is adapted to provide a time stamp reference for a first signal from the first antenna and a second signal from the second antenna.

8. The system of claim 1 wherein the position determinator is adapted to receive a second aircraft signal to determine the three-dimensional position of the aircraft.

9. The system of claim 1 wherein the second antenna is coupled to the processor by a cable adapted to propagate the signal from the second antenna to the processor over a long distance.

10. The system of claim 1 wherein at least one fiber optic RF link is used to couple the first antenna and the second antenna to the processor.

11. The system of claim 1 wherein a receiver coupled to the second antenna includes a low noise amplifier without a down converter.

12. A method for determining a position of an aircraft comprising the steps of:
    positioning a first antenna at a spaced baseline distance from a second antenna;
    receiving an aircraft signal at each of the first and second antennas;
    sending a first signal from the first antenna and a second signal from the second antenna to a processor, the first and second signals corresponding to the aircraft signal;
    determining a time difference of arrival range between the second antenna and the aircraft using a sampled data set produced by time sampling the first signal from the first antenna and the second signal from the second antenna with a common time reference signal; and
    determining the position of the aircraft based upon the baseline distance between the second antenna and the first antenna, a range between the first antenna and the aircraft, and the time difference of arrival range between the second antenna and the aircraft.

13. The method of claim 12 wherein the range between the first antenna and the aircraft is determined by a ranging calculation of the first antenna.

14. The method of claim 12 wherein the step of determining a time difference of arrival range between the second antenna and the aircraft comprises the steps of:
    determining a time difference of arrival range between the first signal and the second signal using the sampled data set; and
    calculating the time difference of arrival between the second antenna and the aircraft based upon the time difference of arrival between the first and the second signals, the range between the first antenna and the aircraft, and the-speed of light.

15. The method of claim 14 wherein the step of calculating a time difference of arrival between the first signal and the second signal comprises the step of performing a cross correlation on the sampled data set to determine the time difference of arrival.

16. The method of claim 12 further comprising the steps of:
    receiving a second aircraft signal; and
    determining a three-dimensional position of the aircraft.

17. The method of claim 12 wherein the spaced baseline distance between the first antenna and the second antenna is approximately 1000 feet (304.80 meters).

18. The method of claim 12 wherein a sampling rate for time sampling the first signal and the second signal is at least two times a bandwidth of the first signal and the second signal.

19. A method of using a time difference of arrival processor to determine a position of an aircraft transmitting a signal comprising the steps of:

determining a range ($R_1$) between a second antenna and the aircraft by measuring a range ($R_2$) between a first antenna and the aircraft and calculating a time difference of arrival between the signal from the aircraft received by the second antenna and the signal from the aircraft received by the first antenna using a common time reference signal, the time difference of arrival being adjusted for a time slippage correlation delay and speed of light; and determining the position of the aircraft based on a baseline distance ($R_3$) between the first antenna and the second antenna, the range ($R_2$) between the first antenna and the aircraft and the range ($R_1$) between the second antenna and the aircraft.

20. The method of claim 19 wherein the range ($R_1$) between the second antenna and the aircraft is determined by the formula:

$$R_1 = R_2 + TDOA \times c$$

where TDOA equal the time difference of arrival between the signal from the aircraft received by the second antenna and the signal from the aircraft received by the first antenna, and c equals the speed of light.

* * * * *